—FLARE STACK COMBUSTION TIP

Original Filed July 22, 1968 4 Sheets-Sheet 1

INVENTOR.
ALEXANDER J. TURPIN
BY
M. N. Chauvin
ATTORNEY

FLARE STACK COMBUSTION TIP

Original Filed July 22, 1968 4 Sheets-Sheet 2

INVENTOR.
ALEXANDER J. TURPIN
BY
M. M. Chow
ATTORNEY

FLARE STACK COMBUSTION TIP

Original Filed July 22, 1968 4 Sheets-Sheet 3

INVENTOR.
ALEXANDER J. TURPIN
BY
M. N. Chauz
ATTORNEY

FLARE STACK COMBUSTION TIP

Original Filed July 22, 1968 4 Sheets-Sheet 4

INVENTOR.
ALEXANDER J. TURPIN
BY
M. M. Chenis
ATTORNEY

United States Patent Office

Re. 27,507
Reissued Oct. 10, 1972

27,507

FLARE STACK COMBUSTION TIP

Alexander J. Turpin, Lebanon, Pa., assignor to Smoke-Ban Manufacturing Incorporated, Pasadena, Tex.

Original No. 3,547,567, dated Dec. 15, 1970, Ser. No. 754,135, July 22, 1968. Application for reissue May 13, 1971, Ser. No. 143,672
Int. Cl. F23b *5/00*
U.S. Cl. 431—202 13 Claims

Matter enclosed in heavy brackets [ ] appears in the original patent but forms no part of this reissue specification; matter printed in italics indicates the additions made by reissue.

ABSTRACT OF THE DISCLOSURE

A flare stack combustion tip having a centrally disposed gas conduit having an opening in the lower end thereof for communication with a flare stack and the upper end thereof being at least partially closed, a plurality of spaced apart gas conducting channels extending outward from said gas conduit and in open communication along one end thereof with said gas conduit, and a gas emission orifice in an upper segment of each of said gas conducting channels and extending substantially the entire length of said upper segment, said gas emission orifices being disposed radially with respect to the axis of said gas conduit.

BACKGROUND OF THE INVENTION

The present invention relates to the disposal of gases by combustion. More particularly, the present invention relates to a flare stack combustion tip for the burning of gases resulting from the operation of chemical plants and refineries and other operations which produce combustible gases which must be disposed of either continuously or intermittently.

Many chemical plants, refineries and other operations generate waste gases which must be disposed of in a safe and effective manner. Often these waste gases are merely by-products of a process and are consistently produced in relatively constant volume. In other instances, because of upsets in plant operations, large quantities of gases such as feed materials, intermediates or products must be disposed of quickly to prevent explosions or other hazardous condition from occurring in the plant. Regardless of source, however, the most commonly employed means of disposing of waste gases in the combustion thereof, generally, by means of elevated flare stacks. The effectiveness of this means of disposal of waste gases is largely dependent upon the efficiency of the combustion tip affixed to the upper end of the elevated flare stack. "Combustion tip," as used herein, refers to that structure at the upper end of a flare stack and from which waste gases pass to the burning zone.

As a result of the increasing emphasis placed on air pollution and the enactment of anti-pollution legislation in many states and other political subdivisions within the United States, one of the most important criteria for a combustion tip is that it provide for the burning of waste gases with little or no smoke production and the substantial elimination of odors and hazardous gases resulting from incomplete combustion. While several flare stack combustion tips have been proposed for "smokeless" combustion of waste gases, in general, these combustion tips are rather narrowly limited in the amount of waste gas which can be burned per unit time without smoke production. The burning of waste gases without the production of smoke and with the alleviation of odors and hazardous gases escaping to the atmosphere requires complete combustion of such gases which in turn requires an adequate supply of oxygen for mixing with the waste gases. In most instances, the failure to provide for such adequate supply of oxygen, as air, has been the major deficiency of the known combustion tips.

In addition to smokeless burning, another important criteria of combustion tips is the ability to ignite and maintain igniton of the waste gases. This becomes particularly important in those instances where the waste gases are only periodically introduced into the flare stack. While pilot lights adjacent the combustion tip may serve to ignite gases exiting the combustion tip, it is more efficient and provides greater safety if in addition, a continuous flame can be maintained from the exit of the combustion tip. However, where waste gases are only periodically passed through the flare stack, to maintain such a continuous flame with conventional combustion tips is in most instances relatively expensive. This results from the fact that when no waste gas is passing through the flare stack, the flame must be maintained with gases other than waste gases and with the conventional combustion tips, relatively large quantities of such gases are required to maintain even a minimum continuous flame. To maintain combustion with these conventional combustion tips usually requires a minimum gas flow of approximately three percent and more often upwards of ten percent of the maximum amount of gas which such tip is designed to burn.

In general, prior art combustion tips fail to provide for a fixed flame stand-off from the exit of the tips. Thus, at periods of relatively low gas flow, burning takes place immediately at the exit of the combustion tip while at periods of high gas flow, the flame is at a distance from the exit. Prolonged burning immediately adjacent the combustion tip results in early deterioration of the metal parts of the tip. If flaming takes place at too great a distance from the combustion tip, the flame may not provide for complete combustion and is susceptible to being easily extinguished. It is desirable to maintain a substantially fixed flame stand-off from the exit of the combustion tip at an optimum distance therefrom regardless of gas flowrate.

As a result of the design of conventional flare stack combustion tips, the pilot lights employed for ignition of the waste gases must be located around the periphery of the flare nozzle. Therefore, to insure ignition in areas of variable wind direction, a multiplicity of pilots spaced around the periphery must be employed. Additionally, with conventional combustion tips, the pilot lights generally are extended upward and inward beyond the flare tip and into the area through which effluent waste gas will pass. Therefore, during periods of gas flow, the waste gas is continuously passing around and over the pilot light and at low gas flow, the pilot light is within the flame of the burning gases. As a result, the pilot lights quickly deteriorate and fail and must be replaced.

It is an object of the present invention to provide a new and improved flare stack combustion tip.

Another object of the present invention is to provide a flare stack combustion tip whereby large quantities of waste gases may be rapidly burned with little or no smoke production.

It is also an object of the present invention to provide a flare stack combustion tip whereby the escaping of odors and hazardous gases to the atmosphere during the burning of waste gases is substantially alleviated.

An additional object of the present invention is to provide a flare stack combustion tip which provides for a continuous flame with a significant reduction in fuel requirements as compared to conventional combustion tips.

Another object of the present invention is to provide a flare stack combustion tip whereby waste gases are readily ıd effectively ignited on exciting the combustion tip ıgardless of wind velocity and direction.

Still another object of the present invention is to prode a combustion tip which provides for a substantially ked flame stand-off from the exit of the tip.

Yet another object of the present invention is to provide flare stack combustion tip which requires fewer pilot ghts and which allows an arrangement of pilot lights hereby a longer life for such pilot lights result.

A remaining object of the present invention is to prode a flare stack combustion tip which remains cooler ıring combustion of waste gases thereby reducing metal eterioration due to high temperatures.

Additional objects will become apparent from the folwing description of the invention herein disclosed.

SUMMARY OF THE INVENTION

The present invention, which fulfills these and other ojects, is a flare stack combustion tip comprising a cenally disposed gas conduit having an opening in the wer end thereof for communication with a flare stack ıd the upper end thereof being at least partially closed, a lurality of spaced apart gas conducting channels extendg outward from said gas conduit and in open comunication along one end thereof with said gas conduit, ıd a gas emission orifice in an upper segment of each f said gas conducting channels and extending substanally the entire length of said upper segment, said gas nission orifices being disposed radially with respect to ıe axis of said gas conduit.

DESCRIPTION OF THE PREFERRED EMBODIMENTS

Figure 1:
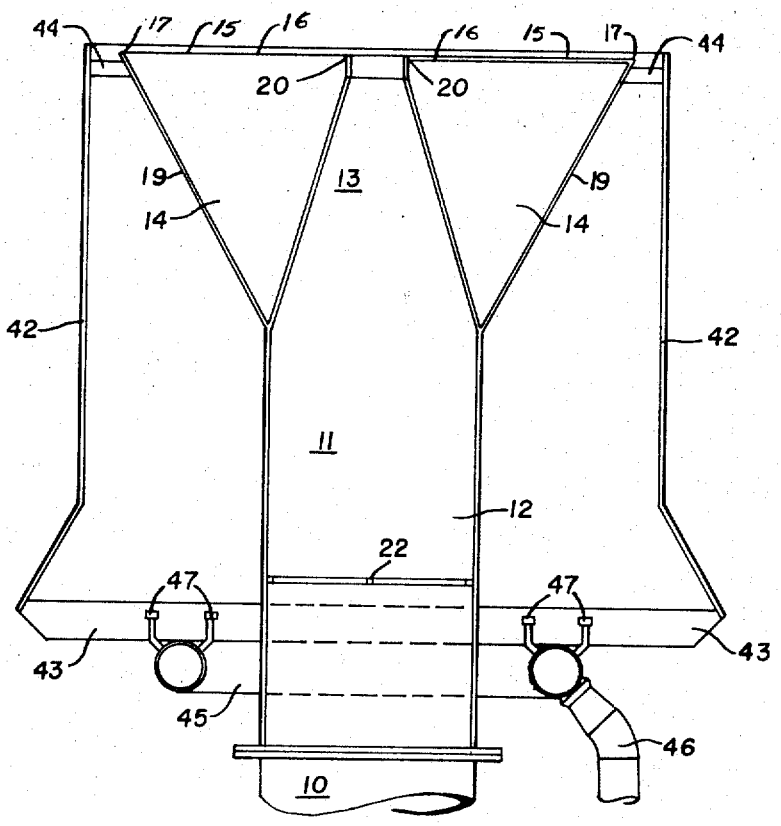
FIG. 1 of the drawings is a cross-sectional view of an nbodiment of the combustion tip of the present invenon.

To describe the preferred embodiments of the combuson tip of the present invention, reference is made to the companying drawings. In the drawings, like characters e used throughout to designate like features.

Figure 9:
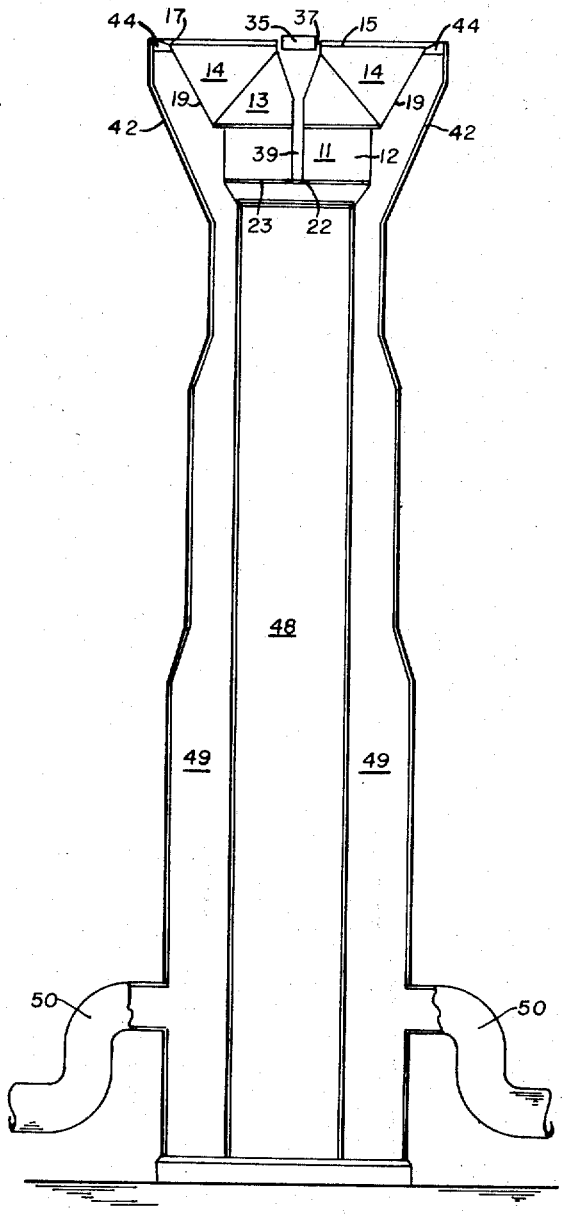
FIG. 9 of the drawings is a cross-sectional view of an nbodiment of the combustion tip of the present invenon affixed to the upper end of a self supporting flare ack.

Referring to the drawings, the combustion tip of the esent invention is shown affixed to the top of a standpe or flare stack 10. Flare stack 10 may be supported by eans of guy wires or a surrounding derrick type structre or may be self supporting as is illustrated in FIG. 9.

Figure 2:
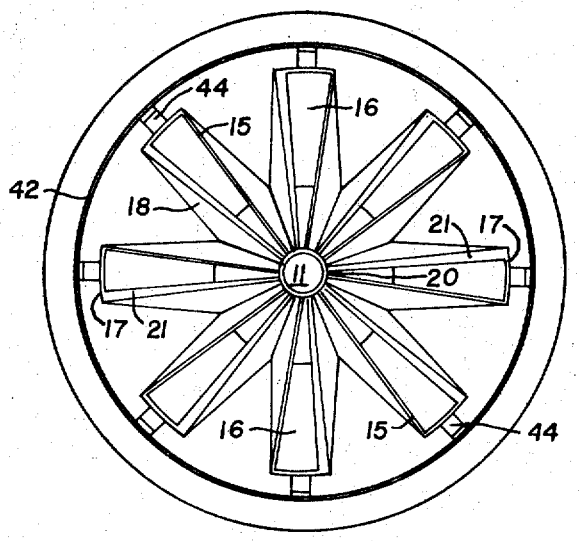
FIG. 2 of the drawings is a top view of the embodient of the combustion tip illustrated in FIG. 1.

The combustion tip comprises a centrally disposed gas onduit 11 which is affixed atop and in open communicaon with flare stack 10. Conduit 11 may be generally ylindrical in shape but most often, as shown in the drawıgs, has a lower segment 12 which is substantially cylinrical in shape and an upper segment 13 which is general- conical in shape, the apex of the cone representing the upper end of conduit 11. As will be more fully discussed below, the upper end of conduit 11 is completely closed to gas flow as illustrated in FIGS. 1 and 2 or only partially closed, the latter being preferred somewhat. By partially closed is meant that the area of the opening, if any, in the upper end of conduit 11 is less than the area of the opening in the lower end of conduit 11.

Flaring outward from upper segment 13 of conduit 11 are a plurality of gas conducting channels 14. As viewed from an end thereof, channels 14 appear flattened in shape presenting a rectangular appearance. Viewed from the side, channels 14 appear triangular in shape. Instead of this flattened, triangular shape, however, channels 14 may take any number of other configurations. For example, channels 14 may be generally rounded or elliptical as viewed from an end thereof and rectangular, parallelogram shaped or trapezoidal, etc., as viewed from the side. These channels 14 are in open communication along the entire base thereof with conduit 11 and serve to distribute or channel gas from conduit 11 to the combustion zone. The number of channels 14 may vary depending upon the particular application of the present combustion tip.

The upper end or segment 15 of each of channels 14 contain a gas emission orifice 16 through which waste gas is discharged for burning, the orifices 16 being radially disposed with respect to the axis of conduit 11. Orifice 16 extends substantially the entire length of upper end 15 though, if desired, it may extend a lesser distance and may be comprised of a plurality of spaced apart slotted or round openings. However, best results are achieved with the single slotted orifice 16 extending the full length of upper end 15 of channels 14. Orifice 16 often has a greater width at its outer end 17 than at its inner end which is a result of walls 18 of channels 14 being spaced further apart at the outer edge 19 of channels 14 than at the inner edge or point 20. Preferably, a lip section 21 which is attached to one wall 18 of channels 14 extends the entire length of upper end 15 partially closing end 15 to gas flow therethrough. By partially restricting waste gas flow through orifice 16, lip section 21 imparts turbulence to gases discharged from orifice 16, generally causing such gases to deviate at an angle of less than 90 degrees from the normal upward flow path. Such deviation of the gas flow path from each of channels 14 imparts a cyclic motion to the gases exiting the combustion tip. Such movement of the exiting waste gases aids in the induction and mixing of air with the waste gases thereby promoting complete combustion. Additionally, the exiting waste gases are less affected by wind as a result of this angular deviation in the effluent waste gas flow path.

As a result of the radial disposition of orifices 16 and the outward extension of channels 14 with open area therebetween, air is more readily induced into the burning zone and more intimately mixed with the waste gases which, of course, results in a greater degree of smokeless burning and in significant alleviation of odors and hazardous gases escaping to the atmosphere. In addition, the air passing between channels 14 aids in cooling the metal surfaces of the channels thereby increasing the useful life of such metals.

A damper 22 is provided as a feature of the combustion tip of the present invention. Damper 22 serves to prevent flashbacks within the flare stack and to reduce the quantity of gases required to keep the flare stack purged of explosive mixtures of waste gases and air resulting from periods when there is substantially no waste gas flow through the flare stack. Damper 22 is illustrated in the drawings as being positioned horizontally within a lower portion of lower segment 12 of conduit 11. From the standpoint of manufacturing a complete combustion tip unit and to hold any flashback that should occur as near the top of the flare as possible, such positioning is preferred. However, the damper may be constructed into the flare stack well below the combustion tip.

Figure 3:
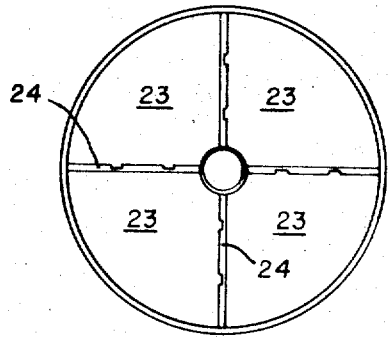
FIG. 3 of the drawings is a top view of a damper of the pe used in the combustion tip of the present invention.

Referring particularly to FIG. 3, damper 22 includes a plurality of triangular gates 23 hinged to a radially disposed header 24. As the gas pressure below the damper 22 increases above a predetermined minimum value, gates 23 are pushed open by the gas to thereby permit gas to flow upward into the combustion tip. However, at very low gas pressures, gates 23 generally remain closed. In a prefered embodiment, damper 22 is provided with one or more openings to permit limited gas flow therethrough.

The above described damper 22 serves to prevent flashbacks within the flare stack by preventing the downflow of air into the flare stack when gates 23 are closed. Additionally, should an explosive mixture of waste gases and air form and flash within the combustion tip, the closure of gates 23 will prevent the downward progression of the flashback into the flare stack. By allowing limited gas flow through damper 22 either as a result of partial opening of gates 23 or by providing one or more fixed openings in damper 22, upward gas flow is restricted such as to provide higher gas velocities within the combustion tip which aids in preventing formation of explosive waste gas and air mixtures within the combustion tip. Additionally, by providing openings in damper 22, a flame can be maintained from the combustion tip despite gates 23 being closed.

Primary ignition of the waste gas is by pilot lights 25 positioned near orifices 16. Fuel for maintaining a flame in pilot lights 25 is supplied by means of pipes 26. Virtually any number of pilot lights may be employed, however, because of the arrangement of the channels 14 of the combustion tip of the present invention, fewer pilot lights are required. Additionally, as will be more fully discussed below, one of the fatures of the present invention is the maintenance of continuous flame from the combustion tip itself with very low gas requirements, which substantially aids in insuring ignition of waste gases passing from the combustion tip. As a result of such features of the present invention, usually a single pilot light is adequate to insure ignition without regard to wind direction and velocity. However, it is usually desirable to provide a second pilot light in order to insure ignition in the event of failure of the first pilot light. These pilot lights 25 are preferably positioned between channels 14 adjacent the confluence of the upper ends 15 whereby regardless of the wind direction, gases will be blown across the pilot light flame and thereby ignited. The pilot lights preferably do not extend above the upper ends 15 of channels 14 and, thus, do not extend into the waste gas effluent from such channels 14. The design of the combustion tip of the present invention permits pilot lights so positioned to effectively ignite waste gases exiting the combustion tip. The particular type of pilot light used is not particularly critical to the present invention and any of those commonly employed for such utility may be used.

Figure 5:
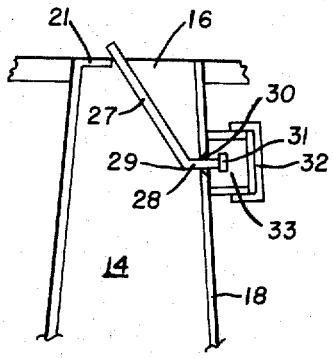
FIG. 5 of the drawings is an end cross-sectional view of gas conducting channel of the combustion tip of the esent invention particularly illustrating the pressure conol plate feature of said channel.
Figure 6:
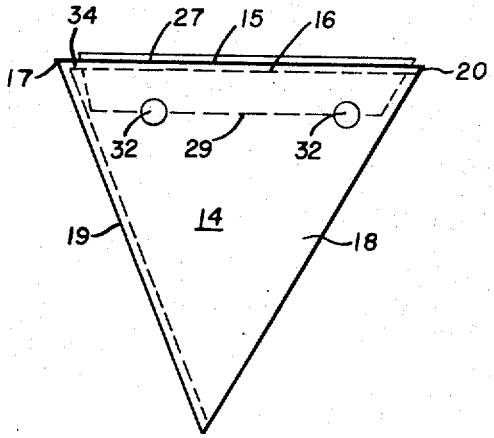
FIG. 6 of the drawings is a side elevational view of a ıs conducting channel of the type illustrated in FIG. 5.
Figure 7:
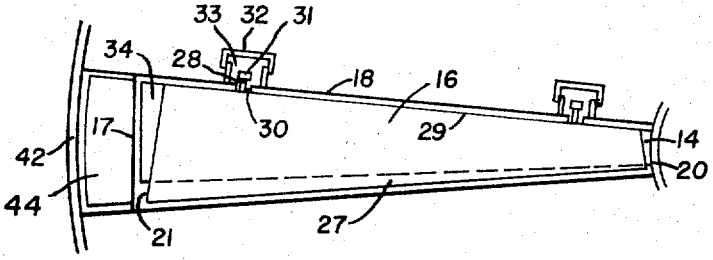
FIG. 7 of the drawings is a top view of a gas conductg channel of the type illustrated in FIGS. 5 and 6.

In a most useful embodiment of the present invention (see particularly FIGS. 5, 6 and 7), channels 14 of the combustion tip are provided with hinged pressure control plates 27 which provide for substantially complete closure of orifices 16 during periods of low gas flow. Preferably, pressure control plates 27 are hinged to a wall 18 of channel 14 opposite the wall to which lip section 21 is attached. Usually, pressure control plate 27 is hinged to wall 18 at a point below the upper edge thereof and such as to extend upward across channel 14 to thereby extend through orifice 16 and in closed position, to rest against lip section 21. The means of hinging pressure control plate 27 to wall 18 preferably comprises two or more lugs 28 which extend from the base 29 of pressure control plate 27 through slots 30 in wall 18. Lugs 28 terminate exterior of channel 14 in a head 31 having a diameter which is greater than the width of slots 30. To prevent the leakage of gas through slots 30 in wall 18, caps 32 are provided on the outside of wall 18 to cover slots 30 and form a leakproof chamber 33 in which head 31 works and in which any gas passing through slots 30 is contained.

By means of pressure control plate 27, a substantially constant velocity for the gases exiting orifices 16 can be maintained over a wide range of gas flows. Without pressure control plate 27, as gas pressures and flows vary within channels 14 and flare stack 10, the velocity of the gases passing from orifices 16 will vary as will in turn, the distances of flame stand-off from the orifices 16. Without pressure control plates 27 and during periods of low gas pressure, gas velocity through orifice 16 will be low and burning will occur substantially at orifice 16 which, as noted above, will result in extreme heating of the metal surfaces adjacent orifice 16 which in turn significantly shortens the useful life of such metal surfaces. Through the use of pressure control plates 27, even at low gas flows, sufficient exit gas velocities can be maintained to provide for a significant flame stand-off from orifices 16 and because pressure control plate 27 raises proportionally to increases in gas flow thereby increasing the open area of orifices 16, substantially the same flame stand-off is maintained through a substantial increase in gas flow within flare stack 10. Pressure control plate 27 also aids in preventing flashbacks within the combustion tip by serving to increase gas velocities above the combustion tip thereby preventing air from passing into the combustion tip.

Pressure control plate 27 preferably is designed such that it does not completely close gas flow through orifice 16 even when in fully closed position. In this embodiment, pressure control plate 27 does not extend to the outer end of orifice 16 thereby leaving a space 34 adjacent the outer end of orifice 16 through which gas can continuously flow. Pressure control plate 27 is sized and shaped such that space 34 is sufficient to permit just enough gas to pass therethrough to maintain a minimum flame adjacent the outermost corner of channels 14. By such design of pressure control plate 27, only a very small amount of gas is required to maintain a continuous flame as compared to the large amounts of gas which ultimately can be burned as the pressure control plates 27 are fully opened. It is, of course, desirable to maintain a continuous flame at the exits of the combustion tip for greater safety and efficiency in ignition of the waste gases.

Figure 4:
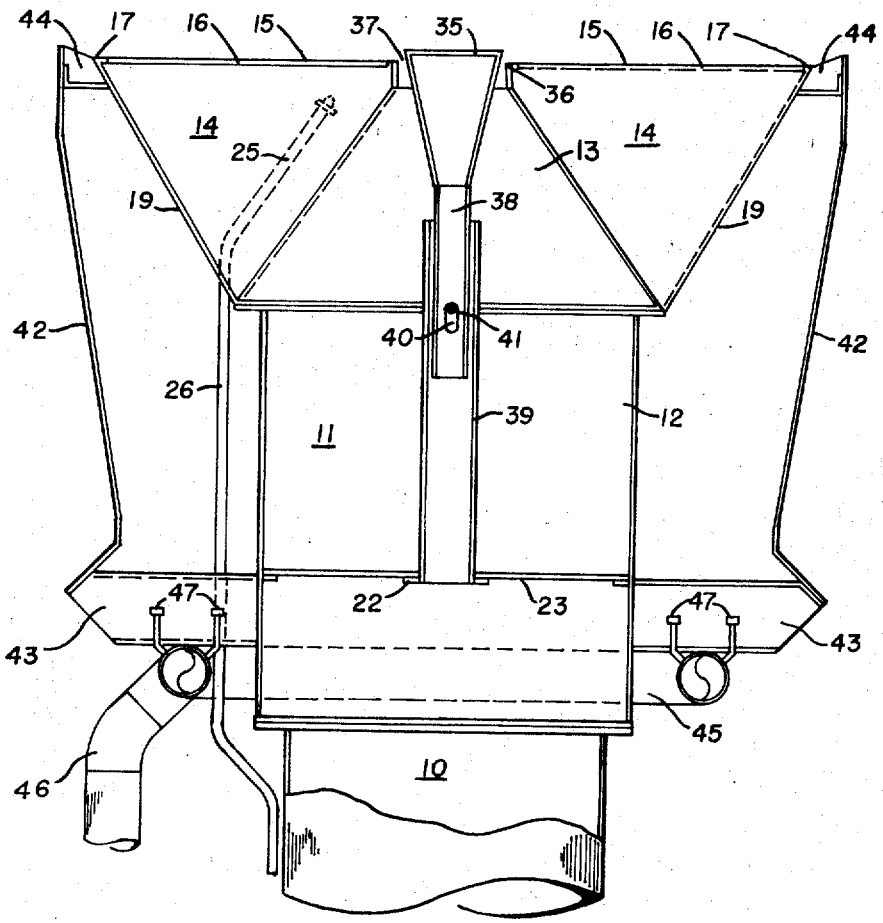
FIG. 4 of the drawings is a cross-sectional view of a articularly useful embodiment of the combustion tip of ıe present invention.

A further means of providing a continuous flame from the combustion tip is illustrated in FIG. 4. This means includes a conical valve member 35 and a valve seating ring 36. An annular opening 37 between valve seating ring 36 and conical valve member 35 is provided whereby when valve member 35 is seated with respect to valve seating ring 36, gas will be permitted to flow between valve member 35 and valve seating ring 36. Generally, annular opening 37 has a radial distance of no less than 1/32 of an inch and seldom more than 3/4 of an inch when valve member 35 is seated.

A tubular anchor pipe 38 extends downwardly from the apex of conical valve member 35 and is slidably engaged for limited vertical movement with flow pipe 39 which is coaxially aligned with conduit 11 but of substantially less diameter than conduit 11. The limited vertical movement of anchor pipe 38 is provided by an elongated opening 40 through anchor pipe 38 and bolt 41 which extends across flow pipe 39 through elongated opening 40. Such arrangement limits the vertical movement of anchor pipe 38 and in turn, the vertical movement of valve member 35, to a distance equal to the vertical length of elongated opening 40. Additionally, as shown in FIG. 4, the resting of the upper edge of elongated opening 40 on the upper surface of bolt 41 serves to position valve member 35 with respect to valve seating ring 36 in such manner as to provide annular opening 37. However, annular openings 37 may be formed by means other than elongated opening 40 and bolt 41 such as for example, by means of a plurality of lugs extending from valve seating ring 36 toward the center thereof upon which valve member 35 may rest or by a plurality of lugs extending from the conical surfaces of alve member 35 which will rest upon surfaces of valve eating ring 36.

Flow pipe 39 preferably extends through damper 22 to llow for flow of gas up through the combustion tip even vhen the gas pressures in flare stack 10 are too low to pen gates 23 of damper 22. Such gas flow passes upvard through flow pipe 39 and around valve member 5 and through annular opening 37 whereupon the gases re burned. In such manner, a continuous flame can be naintaned at the top of the combustion tip even with mounts of gas too small to open gates 23 of damper 2. As the gas flow through the flare stack increases, valve nember 35 is forced upward thereby increasing the radial vidth of annular opening 37 to permit more gas to pass o the combustion area. Valve member 35 is designed in veight and cooperation with the limited vertical movenent permitted by the attachment of tubular anchor pipe 8 to flow pipe 39 such that at approximately the presure required to raise valve member 35 to its full height rom seating ring 36, pressure control plates 27 begin o open thereby permitting gas flow through orifices 16 vhich gas is then ignited by the flame resulting from the ases passing through annular opening 37 and the space 4 adjacent the outermost edge of channels 14.

The conical valve member 35 may be replaced with a ubstantially flat plate valve member which functions as bove described. Also, in many instances, circumstances nay not make attractive the use of a variable opening alve means in the upper end of conduit 11. In such intances, a circular plate or a conical member as described bove may be fixedly positioned in the upper end of onduit 11 in such manner as to provide a fixed size anular opening around the periphery of said plate or memer. With respect to the discussions herein of the annular pening it is to be understood that the term applies not nerely to a substantially continual open space surroundng conical valve member 35 but also includes a plurality f spaced channels annularly arranged about the surface f valve member 35 or other such arrangement.

In most instances, it is desirable to have a shroud 42 nounted to encircle conduit 11 and channels 14. While hroud 42 may be generally cylindrical in shape as shown n FIG. 1, it is preferably venturi shaped as illustrated in IG. 4. Shroud 42 usually extends well below the lowernost point of channels 14 and slightly above or approximately equal in heighth with the uppermost portions of hannels 14. By maintaining the upper edge of shroud 2 only slightly above or in substantially the same horiontal plane as the uppermost segments of channels 14, he formation of a potential combustion chamber within hroud 42 is substantially avoided. Should shroud 42 exend a substantial distance above the uppermost segnents of channels 14, waste gases and air can readily acumulate within the confines of the shroud and upon ignition, can destroy the shroud and possibly the combusion tip. Generally, shroud 42 is positioned with respect o conduit 11 and channels 14 by means of lower supporting plates 43 attached to conduit 11 and upper plates 4 attached to the outermost edges of channels 14. The rimary purposes of shroud 42 are to aid in the induction of air into the flame area and to protect pilot lights 5 and the continuous flame generated during low gas lows through conduit 11 and channels 14 from wind urrents.

Figure 8:
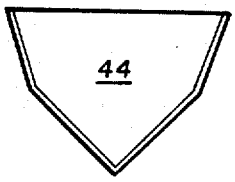
FIG. 8 of the drawings is an end cross-sectional view f a flame retention feature of the combustion tip of the esent invention.

Referring particularly to FIGS. 4 and 8, the upper lates 44 attaching shroud 42 to channels 14 are deigned to serve a secondary and quite useful purpose. In uch design, these upper plates are a substantially V-haped member attached to channels 14 and shroud 42 uch that the apex of the V is just below the outermost dge of channels 14. Such arrangement results in formaion of a receptacle or cup in which gases may collect nd burn in cooperation with the flame permitted by pace 34 during periods of low gas flow thereby aiding n the retention of a continuous flame from the combustion tip. This V-shaped design of upper plates 44 is particularly useful in large combustion tips wherein there is a considerable distance between the outer end of orifices 16 and pilot lights 25 adjacent the confluence of the upper ends of channels 14 or the valve member 35, if such is provided.

To aid in the induction of air into the combustion zone, it is frequently desirable to direct high pressure steam upward along and around the outer surfaces of the conduit 11 and channels 14. In some instances, air may be forced into the combustion zone by means of blowers and the like. One such means for supplying forced air to the combustion zone is described below in reference to FIG. 9. When using high pressure steam to induce air to flow into the combustion zone, a steam conducting ring 45 is disposed around and substantially coaxial with conduit 11 adjacent the lower edge of shroud 42, usually just below such lower edge. Steam conducting ring 45 is connected to a source of high pressure steam by means of steam line 46. To distribute the high pressure steam upward around the surfaces of conduit 11 and between channels 14 and secure maximum air induction, a plurality of spaced apart steam nozzles 47 are connecting to steam conducting ring 45 and positioned to direct a jet of steam upward between and around channels 14. As a practical matter, a considerable distance, usually several feet, will separate the steam nozzles 47 and the actual combustion zone in order to obtain a maximum air induction into the burning area. The exact distance will, of course, vary with the size of the combustion tip, steam pressure, normal flame standoff, and other such factors and can readily be determined by those skilled in the art.

Referring specifically to FIG. 9, the combustion tip of the present invention is shown affixed to the top of a self supporting flare stack which has a primary centrally disposed waste gas conduit 48 which is surrounded by a coaxially aligned annular air conduit 49. Such conduit within a conduit arrangement along with the attendant spacing plates (not shown) provide a flare stack which requires little or no supporting structures to maintain it in an upright position. With such flare stack, generally all of the primary air required to secure substantially complete combustion of the waste gas is provided by forcing air up through conduit 49. "Primary air" is that air not normally available in the combustion zone and which must be induced to flow from surrounding areas or forced from other sources to such combustion zone. The air may be generated by blowers in the lower portion of air conduit 49 or may be introduced into air conduit 49 by one or more transporting pipes 50 connecting air conduit 49 to an air source. As the air passes upward through air conduit 49, it passes up and around conduit 11 and channels 14 and into the combustion area. While a shroud 42 is provided around the combustion tip, this shroud is in reality merely an expanded diameter extension of air conduit 49. If desired, this shroud 42 may be separated from air conduit 49 in such manner as to permit the induction of atmospheric air under the shroud as a complement to the air passing upward through air conduit 49.

What is claimed is:

1. A flare stack combustion tip comprising a centrally disposed gas conduit having an opening in the lower end thereof for communication with a flare stack and the upper end thereof being at least partially closed, a plurality of spaced apart gas conducting channels extending outward from said gas conduit and in open communication along one end thereof with said gas conduit, and a gas emission orifice in an upper segment of each of said gas conducting channels and extending substantially the entire length of said upper segment, said gas emission orifices being disposed radially with respect to the axis of said gas conduit and being partially restricted by means of a lip section extending the entire length thereof from a wall of said gas conducting channel.

2. The flare stack combustion tip of claim 1 wherein said gas conduit is comprised of a lower substantially cylindrical section and an upper conical shaped section from which said gas conducting channels extend.

3. The flare stack combustion tip of claim 1 wherein a shroud is coaxially aligned with said gas conduit and extends downward from adjacent the upper edge of said gas conducting channels to thereby at least partially surround said gas conduit and said gas conducting channels.

4. The flare stack combustion tip of claim 3 wherein said shroud is attached adjacent its upper end to an outer edge of said gas conducting channels by means of a V-shaped member having the apex of the V below the upper edge of said gas conducting channel.

5. The flare stack combustion tip of claim 3 wherein said shroud is venturi shaped.

6. The flare stack combustion tip of claim 1 wherein a pressure control plate is rotatably connected to a wall of each of said gas conducting channels such as to extend across said gas emission orifices and restrict gas flow therethrough, said pressure control plates rotatably responsive to gas flows within said gas conducting channels.

7. The flare stack combustion tip of claim 6 wherein said pressure control plate does not extend the entire length of said gas emission orifice thereby leaving a space adjacent the outer end of said gas emission orifice for the escape of gas from said gas conducting channels.

8. The flare stack combustion tip of claim 1 wherein said gas conduit includes in a lower portion thereof a damper comprising a plurality of generally triangular shaped gates hinged to radially disposed headers and rotatably responsive to gas pressures from either side thereof.

9. The flare stack combustion tip of claim 1 wherein said gas conduit terminates at its upper end in a valve seating ring having a conical member seated therein in spaced apart relation, said conical valve being movably responsive in a vertical direction to gas flow from below.

10. The flare stack combustion tip of claim 1 wherein means is provided for the injection of high pressure steam adjacent the lower end of said gas conducting channels and in an upward direction.

*11. A flare pipe combustion tip comprising an annular shroud-forming casing open at its ends for passage of air thereinto and therethrough, a gas conduit extending substantially through said casing and having an open inlet end for communication with a flare pipe and an outlet end within the exit portion of said casing, channel means communicating with the exit portion of said conduit and extending therefrom substantially across said casing, emission orifice means disposed along the exit portion of said channel means for mixing gas emerging from said conduit with ambient air, and pilot means for igniting the discharged gas and air mixture.*

*12. A combustion tip as described in claim 11 wherein said gas conduit is concentrically disposed within said casing and said channel means comprises a plurality of arms radiating therefrom between which air in said casing passes for contact with gas emerging from said restricted orifice means.*

*13. A combustion tip as described in claim 12 further including upwardly opening flap valve plate means yieldingly mounted in said conduit to restrict the admission of air thereinto and the emission of gas therefrom.*

References Cited

The following references, cited by the Examiner, are of record in the patented file of this patent or the original patent.

UNITED STATES PATENTS

| | | | |
|---|---|---|---|
| 2,537,091 | 1/1951 | Rodman et al. | 431—202X |
| 2,734,562 | 2/1956 | Haberle et al. | 431—202X |
| 2,761,496 | 9/1956 | Verner et al. | 431—202 |
| 3,289,729 | 12/1966 | Reed | 431—202 |
| 3,429,645 | 2/1969 | Reed | 431—202 |

FOREIGN PATENTS

| | | | |
|---|---|---|---|
| 1,226,272 | 2/1960 | France | 431—202 |

EDWARD G. FAVORS, Primary Examiner

U.S. Cl. X.R.

23—277 C